(No Model.)
C. F. GODDARD.
MOTOR WHEEL DEVICE.
No. 581,278. Patented Apr. 27, 1897.
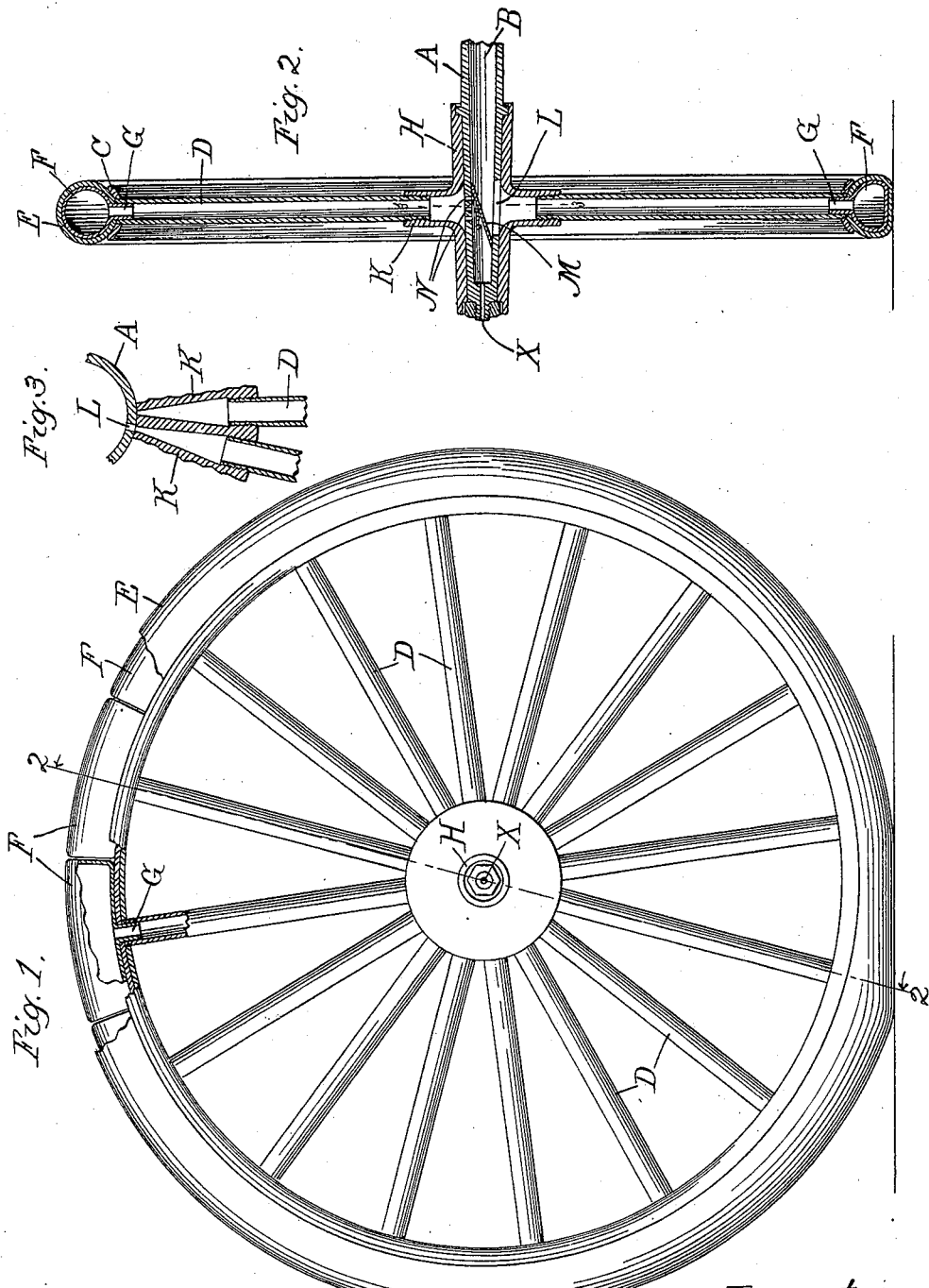
Witnesses.
E. T. Wray.
Donald McCarter.
Inventor.
Charles F. Goddard,
by Francis W. Parker,
his Att'y.

UNITED STATES PATENT OFFICE.

CHARLES F. GODDARD, OF CHICAGO, ILLINOIS, ASSIGNOR OF ONE-HALF TO SETH A. MINARD, OF SAME PLACE, AND WILLIAM S. STUCKENBERG, OF CINCINNATI, OHIO.

MOTOR-WHEEL DEVICE.

SPECIFICATION forming part of Letters Patent No. 581,278, dated April 27, 1897.

Application filed July 31, 1896. Serial No. 601,153. (No model.)

*To all whom it may concern:*

Be it known that I, CHARLES F. GODDARD, a citizen of the United States, residing at Chicago, in the county of Cook and State of Illinois, have invented a certain new and useful Motor-Wheel Device, of which the following is a specification.

My invention relates to motor-wheel devices, and has for its object to provide certain new and useful improvements in "wheel-motors," so to speak.

The essential features or characteristics of my invention are those whereby it is made possible for a wheel to be, as it were, self-propelling, while at the same time dispensing with mechanism and devices about the hub.

In the drawings, which are to be considered as illustrative or diagrammatic of the invention proper, I have shown in Figure 1 a side view of a wheel containing my improvement with parts broken away. Fig. 2 is a cross-section. Fig. 3 is an enlarged detail view on the line 3 3 of Fig. 2.

Like parts are indicated by the same letters in the different figures.

A is the axle, having the internal aperture or passage B.

C is the rim, and D D the hollow spokes extending from the rim to the hub H and connected therewith by the short hollow projections K K from the hub H.

L is a slot or opening through the wall of the axle on one side.

M is a partition dividing the internal aperture of the axle into two parts, and N N are holes on the opposite side of the axle from the slot L.

E is a cover for the tire, that comprises a flexible tire having the internal flexible sections F F separated each from the other and associated one with each spoke and connected with such spoke by the nipple G. I have not dwelt upon the details of this connection, as it can be effected in many well-known ways, but the point is that each section F F is placed in connection with one spoke D, the same being an air-tight connection. The axle A is connected in any desired manner to any suitable source or reservoir of power, the intention being to introduce such power through the hollow axle in the manner hereinafter described.

I do not dwell upon the other features of the vehicle, though what I have here shown is in fact but one wheel and one end of an axle which, when prolonged and provided with a corresponding wheel at the other end, would constitute the principal driving-wheels of a carriage. There should be associated with them one or more supporting-wheels for the carriage.

X is a hole through the end of the axle which connects with the inner aperture therein on the outer side of the partition M.

Now by reference to Fig. 1 it will be observed that the tire at the left is inflated and much thicker in the line of the length of the spokes than is the tire at the right. The slot L being placed a trifle to the left of the vertical line in ordinary use, when a charge of compressed air, for example, is permitted to pass through the axle it will escape from the slot L into the spoke which is just passing to the left from the vertical, and the charge of air will pass down through the spoke and will inflate that particular section F of the tire which lies a little back of the vertical. This immediately lengthens the line from the outer extremity of the tire to the hub, and, since the vertical line is relatively short, causes the wheel to turn in the direction of the arrow. This process is carried out by each successive spoke as it passes under the slot L. At the same time, as soon as the spoke has in the forward motion of the wheel passed around to the other side, its interior is open to the external air through the holes N N and outer portion of the axle A and the hole X, which extends through the outer end of the axle.

I claim—

1. In a motor the combination of a wheel-like body with a flexible tire and means for successively expanding and contracting the tire in sections, so as to vary the distance of the periphery of said tire from the center of said wheel.

2. In a motor the combination of a wheel-like body with a flexible tire consisting of separate and independent sections, and means for successively expanding said sections.

3. In a motor the combination of a wheel-like body with a tire consisting of a series of unconnected hollow flexible sections, and means for successively introducing fluid under pressure from a common source into said sections.

4. In a motor a wheel-like body provided with a tire capable of being expanded in sections radially and means for successively expanding said sections at a predetermined point.

5. A motor device comprising a wheel with a tire consisting of a series of hollow unconnected flexible sections, a source of fluid-supply, and means for successively connecting said hollow flexible sections with said source of fluid-supply.

6. A motor device comprising a wheel with a tire consisting of a series of hollow unconnected flexible sections, a source of fluid-supply, and a connection from said source of fluid-supply to said wheel, said connection so constructed that the flexible sections of the tire may be successively charged with fluid from said source of fluid-supply, and means for exhausting the fluid from such flexible sections at a predetermined point.

Chicago, Illinois, July 21, 1896.

CHARLES F. GODDARD.

Witnesses:
FRANCIS M. IRELAND,
DONALD M. CARTER.